United States Patent Office 3,480,676
Patented Nov. 25, 1969

3,480,676
PROCESS OF PURIFYING KETENE
Hermann Scheuber, Viege, Switzerland, assignor to Lonza Ltd., Gampel, Valais, Switzerland
No Drawing. Filed Nov. 3, 1967, Ser. No. 680,346
Claims priority, application Switzerland, Nov. 3, 1966, 15,869/66
Int. Cl. C07c 49/22, 45/24
U.S. Cl. 260—585.5
7 Claims

ABSTRACT OF THE DISCLOSURE

Raw ketene, which is obtained by separating it from a mixture of ketene, water, acetic acid and acetic anhydride formed by thermal dissociation of acetic acid under pressures lower than normal pressure in the presence of catalysts, is purified by increasing the temperature of this raw ketene for a short duration whereby additional acetic anhydride is formed and then cooling the raw ketene to temperatures at which the acetic anhydride is separated by condensation.

---

Ketene can be manufactured by eliminating the water from acetic acid under pressures lower than normal pressure, for example from 10 to 400 mm. Hg (millimeters of mercury), at temperatures of from 650 to 800° C., in the presence of known catalysts such as alkylated phosphates. The separation of the gaseous ketene thus obtained, from the water which is formed and from the acetic acid which has not reacted is accomplished by abrupt cooling to temperatures which can be as low as about −10° C. With the aid of blowers or compressors, the pressure of the ketene is then brought to values appropriate for the subsequent treatments.

In order to obtain the ketene with a good yield, it is necessary to separate the water which is formed and the acetic acid as rapidly and as completely as possible, while the pressure is still lower than normal pressure.

It has been noted that by proceeding in this manner, the water formed and the acetic acid cannot be completely eliminated from the ketene, due to the fact that both the water and the acetic acid have at −10° C. a non-negligible vapour pressure, and consequently their partial pressures in the gaseous mixture are relatively high. Now, for the subsequent uses of the ketene, it is extremely important to obtain the ketene in the purest form possible. Supplementary dehydration by cooling the reactant gases to temperatures lower than −10° C., leads to considerable practical difficulties, since the mixtures of acetic acid and water thus removed freeze, block the cooling devices and necessitate very large cooling surfaces.

It is also known to wash the raw ketene with acetic anhydride under pressures of at the most 200 mm. Hg and at temperatures lower than −10° C. However, even the ketene obtained under these conditions has a water content and an acetic anhydride content which are too high to be able to be used for certain chemical reactions.

An object of the present invention is to provide a process adapted to permit satisfactory purification of ketene.

The process according to the invention is characterized by the fact that the gaseous ketene, obtained by thermal dissociation of the acetic acid in the presence of catalysts under pressures lower than normal pressure and rid of most of the water of dissociation, the acetic acid or the acetic anhydride respectively, is subjected, for a short duration, to an increase of temperature, and then brought back to temperatures such that the acetic anhydride is separated by condensation.

Preferably, the temperature of the ketene is brought to a value of from 50 to 100° C. for 2 to 80 seconds.

According to a preferred method of carrying out the process, a quantity of acetic anhydride of from 2 to 10% by volume, taking into account the raw gaseous ketene, is added to the ketene, before or during the increase of temperature.

It is advantageous, after the above mentioned temperature increase, to cool the ketene to temperatures of from 10° to −40° C., preferably from 0° to −20° C., due to which the water, the acetic acid and the acetic anhydride still remaining in the raw ketene are separated for the most part.

The process according to the invention can be advantageously carried out as follows.

The gaseous mixture which comes from the dissociation installation for the acetic acid and which comprises essentially ketene, water and acetic acid, is rid in the usual manner of most of the water and non-used acetic acid that it contains, due to cooling in several stages, under pressures lower than normal pressure. It is then, should the need arise by adding some acetic anhydride vapour, that the temperature of the gaseous ketene thus obtained, which still contains small quantities of water and acetic acid or acetic anhydride, is increased for a short period, the pressure being advantageously 400 mm. Hg at the most. It is probable that the water and the acetic acid which are still contained in the gaseous ketene are then transformed into acetic anhydride by chemical reaction with the ketene, acetic anhydride being the compound which can be separated the most easily.

Although the increase of temperature of the ketene and the complete elimination of the water, the acetic acid and the acetic anhydride are carried out, preferably, on the intake side of the vacuum pump, it is also possible to carry out the process according to the invention on the delivery side of the vacuum pump.

In the examples given hereafter, the description of the manufacture of ketene with and without carrying out the process of purification according to the invention are given as well as the comparison of the results obtained.

EXAMPLE 1

In one hour, 80 liters (which corresponds to 146 grammes) of raw ketene containing 3.5% by volume acetic anhydride, is passed through a 5 liter glass flask whose temperature is maintained at 90° C. by a water bath. The raw ketene is passed through the flask at a pressure of 150 mm. Hg, and the duration for which the gaseous mixture remains inside the flask at a temperature of 90° C. is 65 seconds. The acetic anhydride present is then separated at a temperature of −20° C. The residual gaseous ketene then has an acetic anhydride content of 0.5% by volume. The raw ketene was obtained in the first place by dissociation of acetic acid under reduced pressure.

Without increasing the temperature to 90° in the 5 liter glass flask, the same gaseous ketene (also after condensation at −20° C.) has an acetic anhydride content of 1.5 to 2.5% by volume.

EXAMPLE 2

In one hour, 200 liters (that is to say 366 grammes) of ketene to be purified whose pressure is 200 mm. Hg is passed through a 1 liter flask whose temperature has been brought to 60° C. by a water bath. Simultaneously, 10 liters (that is to say a quantity of 46 grammes) of gaseous acetic anhydride is introduced (the duration for which the gaseous mixture remains in the flask at 60° being 3.5 seconds). Then a total quantity of 57 grammes of acetic anhydride is separated by condensation at a temperature of −10° C. The residual gaseous ketene has an acetic anhydride content of 0.2% by volume.

Without the above mentioned increase of temperature in the 1 liter flask, the same gaseous ketene has, after condensation at −10° C., an acetic anhydride content of 2 to 3% by volume.

EXAMPLE 3

On the delivery side of a liquid ring pump actuated by means of diketene, 90 parts by volume of raw ketene having a content of 1% by volume acetic anhydride, as well as 10 parts by volume acetic anhydride vapour are simultaneously introduced into a container, and subjected therein, for 30 seconds, to a temperature of 70° C., under a pressure of 800 mm. Hg. Then the gaseous mixture is brought to a temperature of 0° C. The residual acetic anhydride content in the ketene is then 0.1% by volume.

Without increasing the temperature inside the above mentioned container, the same ketene has, after cooling to 0° C., an acetic anhydride content of 0.5% by volume.

Although the present invention has been described with reference to various specific examples, it is understood that the invention is not limited thereto, and that various modifications are possible without departing from the spirit or the scope of this invention.

What I claim is:

1. A process of further purifying gaseous ketene separated from a mixture of ketene, water, acetic acid and acetic anhydride formed by thermal dissociation of acetic acid under pressures lower than normal pressure in the presence of catalysts, said process comprising the steps of increasing the temperature of said ketene to from 50° to 100° C. for a duration of from 2 to 80 seconds in order to transform water and acetic acid contained in the gaseous ketene into acetic anhydride by chemical reaction with the ketene, and then cooling said ketene to temperatures of from 10° to −40° C. whereby the acetic anhydride is separated by condensation.

2. A process according to claim 1 in which, in said step of cooling, said ketene is cooled to temperatures of from 0° to −20° C.

3. A process according to claim 1 including the further step of adding some acetic anhydride to said ketene, at the latest during said step of increasing the temperature.

4. A process according to claim 3 in which said acetic anhydride is added in an amount of from 2 to 10% volume calculated with respect to said ketene.

5. A process according to claim 1 in which said steps of increasing the temperature and cooling are carried out at the intake side of a vacuum pump.

6. A process of purifying gaseous ketene separated from a mixture of ketene, water, acetic acid and acetic anhydride formed by thermal dissociation of acetic acid under pressure lower than normal pressure in the presence of catalysts said process comprising the steps of increasing the temperature of said ketene to at least 50° C. for a short duration in order to transform water and acetic acid contained in the gaseous ketene into acetic anhydride by chemical reaction with the ketene, and then cooling said ketene to temperatures of from 10° to −40° C. at which the acetic anhydride is separated by condensation.

7. The process according to claim 6 wherein the temperature of said ketene is increased from 50 to 100° C.

References Cited

UNITED STATES PATENTS

| 2,967,888 | 1/1961 | Altenschöpfer | 260—585.5 |
| 2,816,143 | 12/1957 | Probst | 260—585.5 |
| 2,989,565 | 6/1961 | Perren | 260—585.5 |

FOREIGN PATENTS

| 1,147,220 | 4/1963 | Germany. |

BERNARD HELFIN, Primary Examiner

M. M. JACOB, Assistant Examiner

U.S. Cl. X.R.

260—546